US011196678B2

(12) United States Patent
Glasco

(10) Patent No.: US 11,196,678 B2
(45) Date of Patent: Dec. 7, 2021

(54) QOS MANAGER FOR SYSTEM ON A CHIP COMMUNICATIONS

(71) Applicant: Tesla, Inc., Palo Alto, CA (US)

(72) Inventor: David Glasco, Austin, TX (US)

(73) Assignee: Tesla, Inc., Palo Alto, CA (US)

( * ) Notice: Subject to any disclaimer, the term of this patent is extended or adjusted under 35 U.S.C. 154(b) by 35 days.

(21) Appl. No.: 16/663,229

(22) Filed: Oct. 24, 2019

(65) Prior Publication Data

US 2021/0126874 A1 Apr. 29, 2021

Related U.S. Application Data

(60) Provisional application No. 62/750,297, filed on Oct. 25, 2018.

(51) Int. Cl.
| | |
|---|---|
| *H04L 12/927* | (2013.01) |
| *H04L 12/911* | (2013.01) |
| *G06F 9/54* | (2006.01) |
| *G06F 15/78* | (2006.01) |
| *H04L 12/26* | (2006.01) |

(52) U.S. Cl.
CPC .......... *H04L 47/805* (2013.01); *G06F 9/542* (2013.01); *G06F 9/546* (2013.01); *G06F 15/7807* (2013.01); *H04L 43/0817* (2013.01); *H04L 47/781* (2013.01); *H04L 47/822* (2013.01)

(58) Field of Classification Search
CPC . H04L 47/822; H04L 47/781; H04L 43/0817; G06F 9/542; G06F 9/546
USPC ....................................................... 709/226
See application file for complete search history.

(56) References Cited

U.S. PATENT DOCUMENTS

| | | | | |
|---|---|---|---|---|
| 6,845,100 B1* | 1/2005 | Rinne | ............... | H04W 28/0263 370/395.43 |
| 8,909,220 B1* | 12/2014 | Aftahi | .................. | H04B 7/2041 455/427 |
| 2010/0002692 A1* | 1/2010 | Bims | ..................... | H04L 1/0018 370/389 |
| 2012/0076103 A1* | 3/2012 | Dai | ..................... | H04W 72/085 370/329 |
| 2012/0213070 A1* | 8/2012 | Lee | ..................... | H04L 41/5003 370/231 |

(Continued)

*Primary Examiner* — Mahran Y Abu Roumi
(74) *Attorney, Agent, or Firm* — Knobbe, Martens, Olson & Bear, LLP

(57) ABSTRACT

An example SoC includes a plurality of processing systems supporting respective Quality of Service (QoS) rules, channel circuitry that is configured to service communications for the plurality of processing systems and that includes a QoS manager. The QoS manager determines that a first processing system of the plurality of processing systems that operates according to first QoS rules desires to send a communication with a first QoS selection of the first QoS rules to a second processing system that operates according to second QoS rules, determines available communication receipt resources of the second processing system of the plurality of processing systems, the second processing system supporting second QoS rules, determines a communication resources allocation for the second processing system based upon the first QoS rules, the second QoS rules, and the first QoS selection, and directs the second processing system to operate according to the communication resource allocation.

25 Claims, 10 Drawing Sheets

(56) References Cited

U.S. PATENT DOCUMENTS

| | | | | |
|---|---|---|---|---|
| 2014/0208071 A1* | 7/2014 | Jeong | ............... | G06F 15/7807 |
| | | | | 712/31 |
| 2015/0281109 A1* | 10/2015 | Saxena | ............... | H04L 49/901 |
| | | | | 370/412 |
| 2018/0150393 A1* | 5/2018 | Kim | ............... | G06F 3/061 |
| 2019/0050252 A1* | 2/2019 | Arbel | ............... | G06F 11/3027 |

* cited by examiner

QOS MANAGER FOR SYSTEM ON A CHIP COMMUNICATIONS

CROSS-REFERENCE TO RELATED APPLICATIONS

This application claims priority to U.S. Provisional App. No. 62/750,297, which was filed on Oct. 25, 2018 and which is entitled, "QOS MANAGER FOR SYSTEM ON A CHIP COMMUNICATIONS," the contents of which are hereby incorporated herein by reference in its entirety.

Any and all applications for which a foreign or domestic priority claim is identified in the Application Data Sheet as filed with the present application are hereby incorporated by reference in their entirety under 37 CFR 1.57.

BACKGROUND

Technical Field

The present disclosure relates to a System on a Chip (SoC) that includes a plurality of separate processing systems and more particularly to the management of communications between the plurality of separate processing systems of the SoC.

Description of Related Art

FIG. 1 is a block diagram illustrating a prior art SoC 100 that includes a plurality of processing systems 102A-102L arranged on a single integrated circuit. Each of the processing systems 102A-102L performs corresponding processing functions. A channel is located among and between the plurality of processing systems 102A-102L. Channel circuitry 104 contained in the channel services data transfers between the plurality of processing systems 102A-102L and also may perform additional processing functions.

The channel circuitry 104 services communications between the plurality of processing systems 102A-102L. The plurality of processing systems 102A-102L typically each has native Quality of Service (QoS) rules for external communications so that at least some of the processing systems have differing QoS rules. For example, one of the processing systems, e.g., processing system 102D, may have two QoS levels while another of the processing systems, e.g., processing system 102F may have three QoS levels. Typically, a processing system has resources, e.g., input buffers and output buffers, allocated to differing QoS levels. Thus, QoS level disparity that exists between differing processing systems causes a mismatch between resources in one processing system as compared to resources in another processing system. This mismatch may result in communication delays, lost data, and can cause the SoC 100 to perform at a reduced efficiency.

SUMMARY

Example embodiments of the present disclosure are directed towards a System on a Chip (SoC). An example SoC includes a plurality of processing systems, each processing system of the plurality of processing systems having at least one communication interface supporting respective Quality of Service (QoS) rules. The SOC further includes channel circuitry coupled to and residing among the plurality of processing systems, the channel circuitry including communication circuitry configured to service communications for the plurality of processing systems; and a QoS manager. The QoS manager is configured to determine that a first processing system of the plurality of processing systems that operates according to first QoS rules desires to send a communication with a first QoS selection of the first QoS rules to a second processing system that operates according to second QoS rules; determine available communication receipt resources of the second processing system of the plurality of processing systems, the second processing system supporting second QoS rules; determine a communication resources allocation for the second processing system based upon the first QoS rules, the second QoS rules, and the first QoS selection; and direct the second processing system to operate according to the communication resource allocation to receive the communication from the first processing system.

Another example SoC includes a plurality of processing systems, each processing system of the plurality of processing systems having at least one communication interface supporting respective Quality of Service (QoS) rules; and channel circuitry coupled to and residing among the plurality of processing systems. The channel circuitry includes communication circuitry configured to service communications for the plurality of processing systems; and a QoS manager. The QoS manager is configured to monitor available communication receipt resources of a second processing system of the plurality of processing systems, the second processing system supporting second QoS rules; determine that a first processing system of the plurality of processing systems that operates according to first QoS rules desires to send a communication with a first QoS selection of the first QoS rules; determine a communication resources allocation for the second processing system based upon the available communication receipt resources, the first QoS selection, the first QoS rules, and the second QoS rules; and direct the first processing system to transmit the communication to the second processing system according to the communication resources allocation.

Embodiments of the present disclosure are directed to methods for operating a SoC which includes a plurality of processing systems and a Quality of Service (QoS) manager. An example method includes the QoS manager determining that a first processing system of the plurality of processing systems that operates according to first QoS rules desires to send a communication with a first QoS selection of the first QoS rules to a second processing system that operates according to second QoS rules; the QoS manager determining available communication receipt resources of the second processing system of the plurality of processing systems, the second processing system supporting second QoS rules; the QoS manager determining a communication resources allocation for the second processing system based upon the first QoS rules, the second QoS rules, and the first QoS selection; and the QoS manager directing the second processing system to operate according to the communication resource allocation to receive the communication from the first processing system.

Another example method includes the QoS manager monitoring available communication receipt resources of a second processing system of the plurality of processing systems, the second processing system supporting second QoS rules; the QoS manager determining that a first processing system of the plurality of processing systems that operates according to first QoS rules desires to send a communication with a first QoS selection of the first QoS rules; the QoS manager determining a communication resources allocation for the second processing system based upon the available communication receipt resources, the first QoS selection, the first QoS rules, and the second QoS rules; and the QoS manager directing the first processing system to transmit the communication to the second processing system according to the communication resources allocation.

DETAILED DESCRIPTION

This specification describes techniques to manage different quality of service (QoS) rules. For example, a system on a chip (SoC) may include a multitude of processing systems or elements. As described above, these processing systems may be associated with different QoS rules. It may be appreciated that a QoS rule may inform use of one or more buffers associated with a processing system or element. For example, a processing system or element may have different buffers allocated to differing QoS levels. Example buffers may at least include a receive buffer and a transmit buffer. A QoS rule may inform selection of a QoS level, such that a buffer, or a portion thereof, may be allocated based on the selection. Being able to include processing systems or elements on a same SoC introduces technological benefits.

As will be described below, a QoS manager can allow adjustment of buffers (e.g., transmit buffers, receive buffers, and so on) used by different processing systems or elements included in one or more SoCs. For example, the QoS manager can obtain information identifying that a first processing system is to transmit information to a second processing system. The first processing system may use first QoS rules, and the communication may be associated with a particular selection of the first QoS rules. As described above, this selection may inform allocation of a buffer. The second processing system may use second QoS rules, which may be different from that of the first QoS rules.

Advantageously, the QoS manager may determine a communication resource allocation for the second processing system. For example, the communication resource allocation may adjust a receive buffer of the second processing system. In this example, the adjustment may conform the receive buffer to the selection of the first QoS rules. As an example, the receive buffer of the second processing system may be subdivided according to the first QoS rules. An example of adjusting a receive buffer is described below, with respect to FIG. 8.

The QoS manager may therefore allow for management (e.g., translation and/or negotiation) of different QoS rules. In this way, different processing systems or elements may be rapidly included in a SoC. Complexities associated with managing different QoS rules may, as an example, be masked from an end-user or designer of the SoC.

Figure 1:
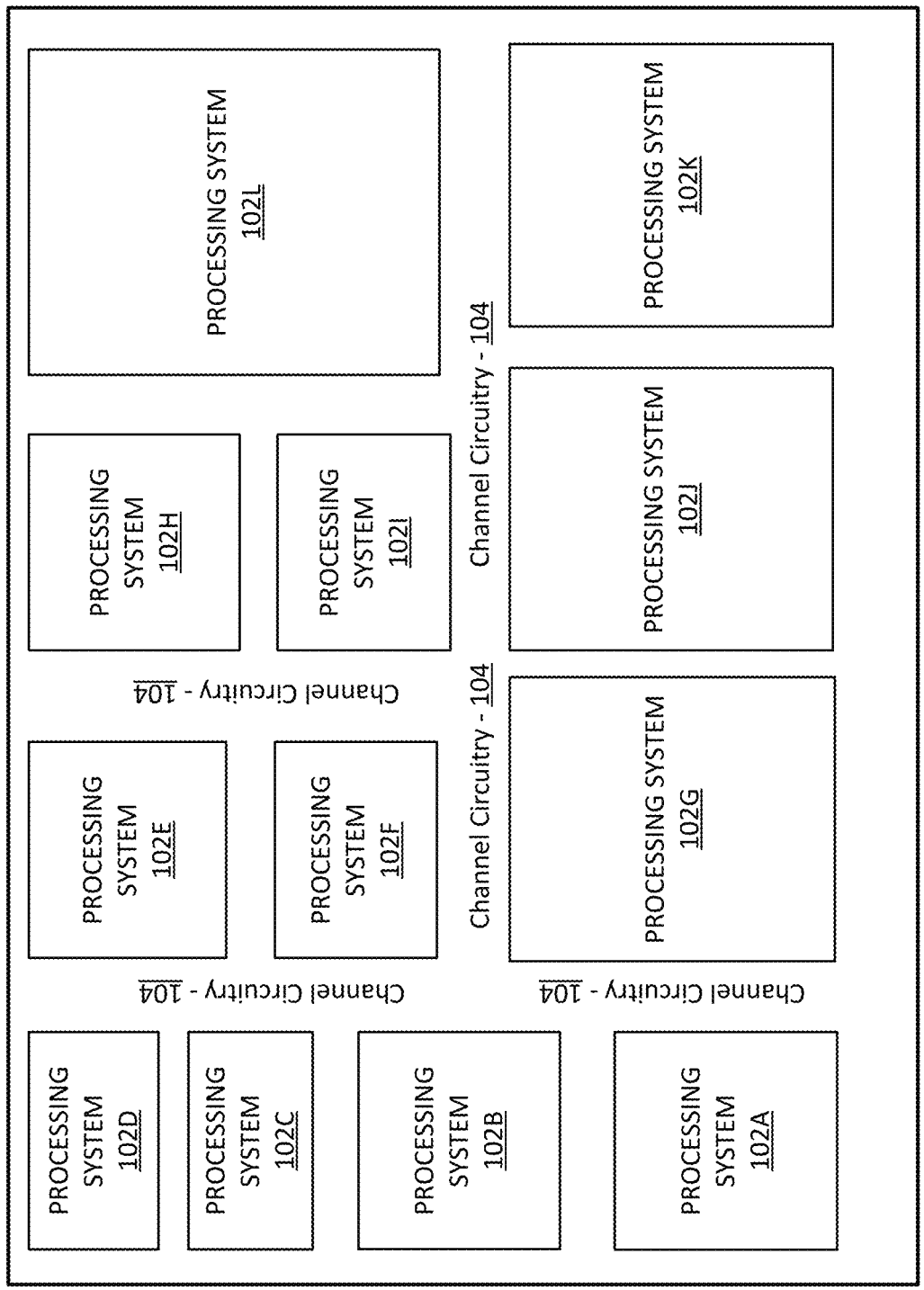
FIG. 1 is a block diagram illustrating a prior art System on a Chip (SoC).
Figure 2:
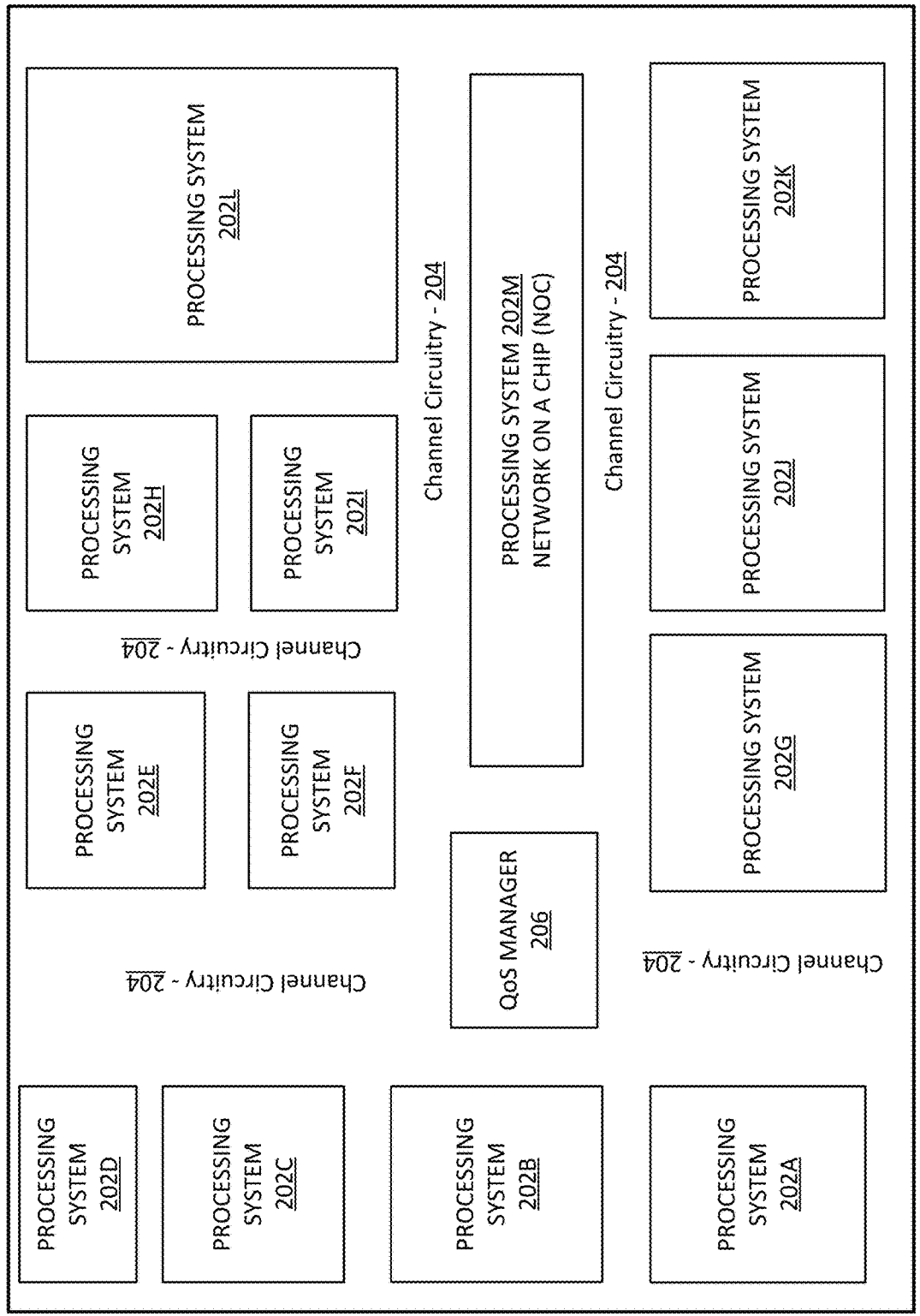
FIG. 2 is a block diagram illustrating a SoC constructed according to an embodiment of the present disclosure.

FIG. 2 is a block diagram illustrating a SoC 200 constructed and operating according to an embodiment of the present disclosure. The SoC 200 includes a plurality of processing systems 202A, 202B, 202C, 202D, 202E, 202F, 202G, 202H, 202I, 202J, 202K, and 202L. These processing systems 202A-202L perform respective functions and have respective structures, e.g., general processor, communications processor (cellular, WiFi, Bluetooth, etc.), network interface processor, image processor, audio processor, graphics processor, arithmetic unit processor, security processor, safety processor, and human interaction processor, memory controller, and computer bus interface processors, among other processing structures. SoCs are often smaller, less expensive, and consume less power than devices that include separate processing systems. Multiple SoCs may be packaged into a multi-chip module to further increase processing capacity. The SoC of FIG. 2 may serve in various systems, e.g., vehicular autonomous driving systems, data center processing systems, data center storage systems, and a great number of other systems.

The plurality of processing systems 202A-202L may be designed by one or more third parties and licensed for use in the SoC 200. In such case, the functionality of these processing systems 202A-202L and their structures may not be alterable in the construction or manufacture of the SoC 200. The processing systems 202A-202L may have unique and differing QoS rules and have unique allocations of communication resources, e.g., input buffers, output buffers, packet processing operations, etc. to service differing Quality of Service (QoS) levels. In such case, the QoS rules may be different for differing processing systems 202A-202L and not consistent therebetween.

Thus, according to a first embodiment of the present disclosure, the SoC 200 includes channel circuitry 204 coupled to and residing among the plurality of processing systems 202A-202L that includes communication circuitry configured to service communications for the plurality of processing systems and a QoS manager 206. The communication circuitry (detail not shown in FIG. 2 but which structure is known) includes one or more communication buses, routers, bridges, and other data flow and routing components that communicatively intercouple the plurality of processing systems 202A-202L.

The channel circuitry 204 further includes a QoS manager 206 configured to manage the QoS of communications among and between the plurality of processing systems 202A-202L. In its operations, the QoS manager 206 determines that a first processing system, e.g. 202M, of the plurality of processing systems that operates according to first QoS rules desires to send a communication with a first QoS selection of the first QoS rules to a second processing system, e.g., 202J, which operates according to second QoS rules. For example, the QoS manager 206 may determine that the first processing system 202M is to communicate with the second processing system 202J (e.g., a signal or message may be received). As another example, the QoS manager 206 may determine that the first processing system 202M has a communication to send to the second processing system 202J. The QoS manager 206 is further configured to determine available communication receipt resources of the second processing system 202J of the plurality of processing systems, the second processing system 202J supporting second QoS rules. The QoS manager 206 is also configured to determine a communication resource allocation for the second processing system 202J based upon the first QoS rules, the second QoS rules, and the first QoS selection. The QoS manager 206 is further configured to direct the second processing system 202J to operate according to the communication resource allocation to receive the communication from the first processing system.

The SoC of FIG. 2 includes a number of options, which may be combined singularly, fully, or in partial combination. According to a first option, the QoS manager 206 is further configured to determine whether the communication request was successfully completed. According to another option, the first processing system 202M is a Network on a Chip (NoC). Further, the second processing system 202J may be a memory controller.

The communication resource allocation may affect a receive buffer of the second processing system that services a first QoS selection of the second QoS rules. With this option, the QoS manager 206 is configured to direct the second processing system to divide the receive buffer into a first portion to service the first QoS selection of the first QoS rules and a second portion to service a second QoS selection of the first QoS rules. With another option, the QoS manager 206 may be configured to monitor a fill state of the first portion, monitor a fill state of the second portion, and direct the first processing system to transmit data to the second processing system based upon the fill state of the first portion and the fill state of the second portion. Further, the QoS manager 206 may be configured to monitor transmit buffers of the first processing system, determine the first QoS selection QoS level of a communication from the first processing system to the second processing system, and, based upon the determined QoS level, adjust an indicated fill state of a receive buffer of the second processing system. An example of these structures/operations will be described with reference to FIG. 8.

According to a second embodiment of the SoC 200, the QoS manager 206 is configured to monitor available communication receipt resources of a second processing system of the plurality of processing systems, the second processing system supporting second QoS rules. The QoS manager 206 is further configured to determine that a first processing system 202M of the plurality of processing systems that operates according to first QoS rules desires to send a communication with a first QoS selection of the first QoS rules. The QoS manager 206 is further configured to determine a communication resources allocation for the second processing system 202J based upon the available communication receipt resources, the first QoS selection, the first QoS rules, and the second QoS rules and direct the first processing system 202M to transmit the communication to the second processing system 202J according to the communication resources allocation.

The second embodiment may also have a number of options. With a first option, the QoS manager 206 is further configured to determine whether the communication request was successfully completed. With another option, the first processing system 202M is a NoC. With another option, the communication resource allocation affects a receive buffer of the second 202J processing system that services a first QoS selection of the second QoS rules. The QoS manager 206 may be configured to direct the second processing system to divide the receive buffer into a first portion to service the first QoS selection of the first QoS rules and a second portion to service a second QoS selection of the first QoS rules. Further, the QoS manager 206 may be configured to monitor a fill state of the first portion, monitor a fill state of the second portion, and direct the first processing system to transmit data to the second processing system based upon the fill state of the first portion and the fill state of the second portion.

Further, the QoS manager may be configured to monitor transmit buffers of the first processing system, determine the first QoS selection QoS level of a communication from the first processing system to the second processing system, and based upon the determined QoS level, adjust an indicated fill state of a receive buffer of the second processing system.

Figure 3A:
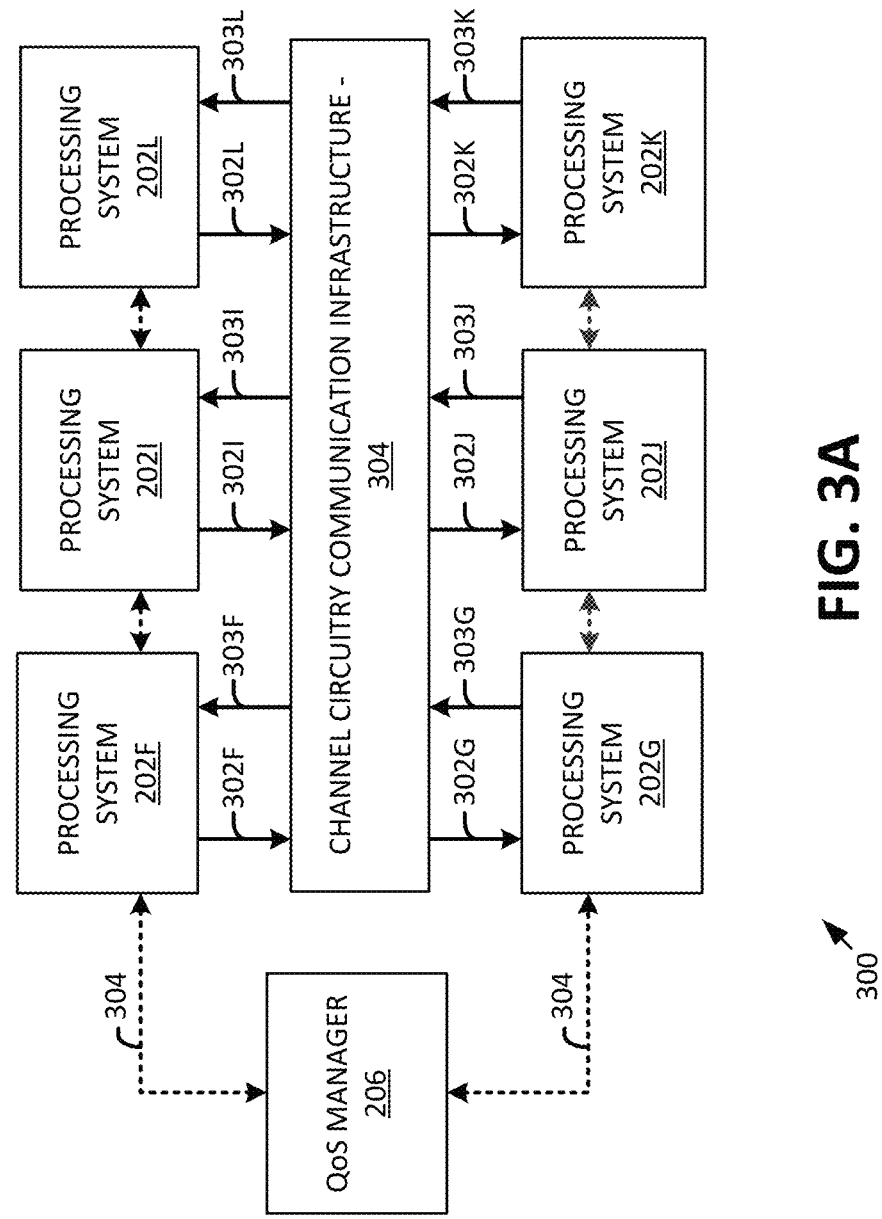
FIG. 3A is a block diagram illustrating a portion of the SoC of FIG. 2 according to a first aspect.

FIG. 3A is a block diagram illustrating a portion of the SoC of FIG. 2 according to a first aspect 300. With this aspect, the channel circuitry 204 includes a channel circuitry communication infrastructure 304, which includes one or more data buses, one or more data switches, one or more data routers, one or more latches, and various other components that service the transfer of data between and among the plurality of processing systems 202A-202M (202F, 202G, 202I, 202J, 202L and 202K shown in FIGS. 3A-3C). With the first aspect 300 of FIG. 3A, the QoS manager 206 resides external to the plurality of processing systems 202A-202M and services bi-directional communications with the plurality of processing systems 202A-202M to monitor the communications requirements (via data paths 304) thereof and to manage the communication resources thereof. Further shown are communication paths 302F, 303F, 302G, 303G, 302I, 302I, 303J, 302L, 303L, 302K and 303K that service communications among and between the plurality of processing systems 202F, 202G, 202I, 202J, 202L, and 202K. The first aspect 300 of FIG. 3A may operate according to the concepts previously described with reference to FIG. 2 and the concepts that will be described with reference to FIGS. 4-8.

Figure 3B:
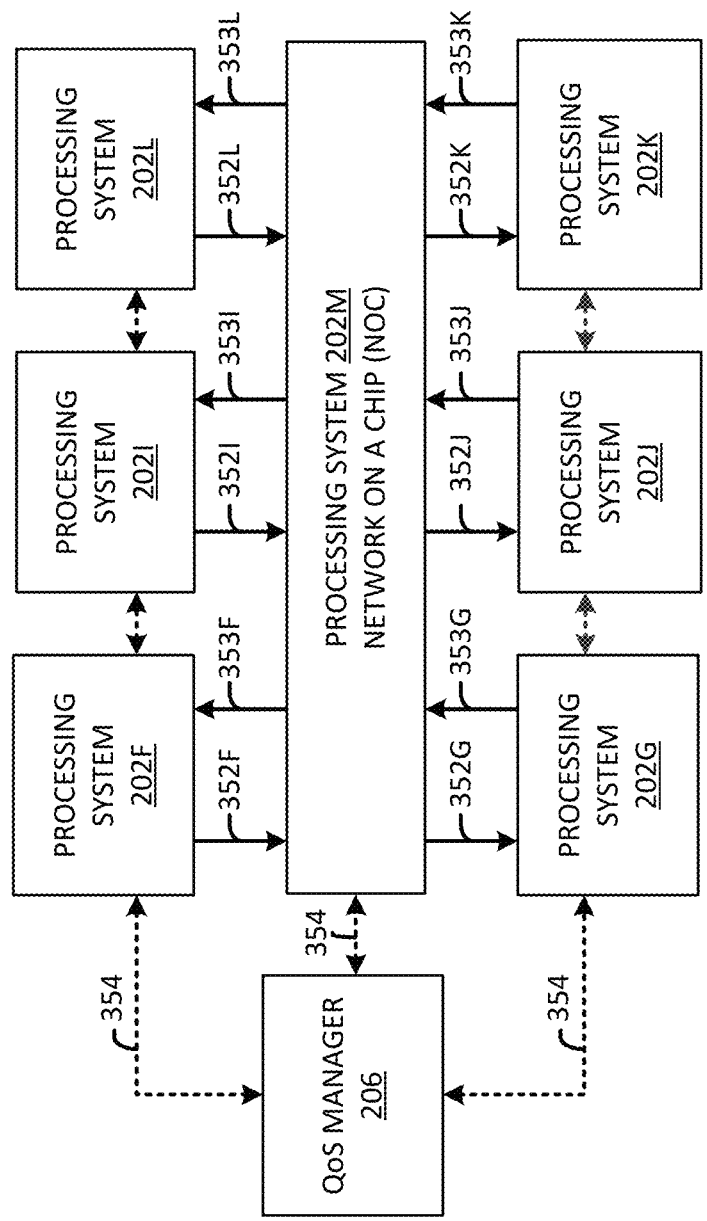
FIG. 3B is a block diagram illustrating a portion of the SoC of FIG. 2 according to a second aspect.

FIG. 3B is a block diagram illustrating a portion of the SoC of FIG. 2 according to a second aspect. With this aspect 350, a network on a chip (NoC) 202M (one of the processing systems) services communications among the plurality of processing systems 202F, 202G, 202I, 202J, 202L and 202K. The second aspect 350 also includes a channel circuitry communication infrastructure, which includes one or more data buses, one or more data switches, one or more data routers, one or more latches, and various other components that service the transfer of data between and among. With second aspect 350 of FIG. 3A, the QoS manager 206 resides external to the plurality of processing systems 202A-202M and services bi-directional communications with the plurality of processing systems 202A-202M to monitor the communications requirements (via data paths 354) thereof and to manage the communication resources thereof. Further shown are communication paths 352F, 353F, 352G, 353G, 352I, 3531, 352J, 353J, 352L, 353L, 352K and 353K that service communications among and between the plurality of processing systems 202F, 202G, 202I, 202J, 202L, and 202K.

As contrasted to the 300 aspect of FIG. 3A, with the aspect 350 of FIG. 3B, the QoS manager cooperates with the NoC 202M to service communications among the plurality of processing systems 202F, 202G, 202I, 202J, 202L, and 202K. The second aspect 350 of FIG. 3B may operate according to the concepts previously described with reference to FIG. 2 and the concepts that will be described with reference to FIGS. 4-8.

Figure 3C:
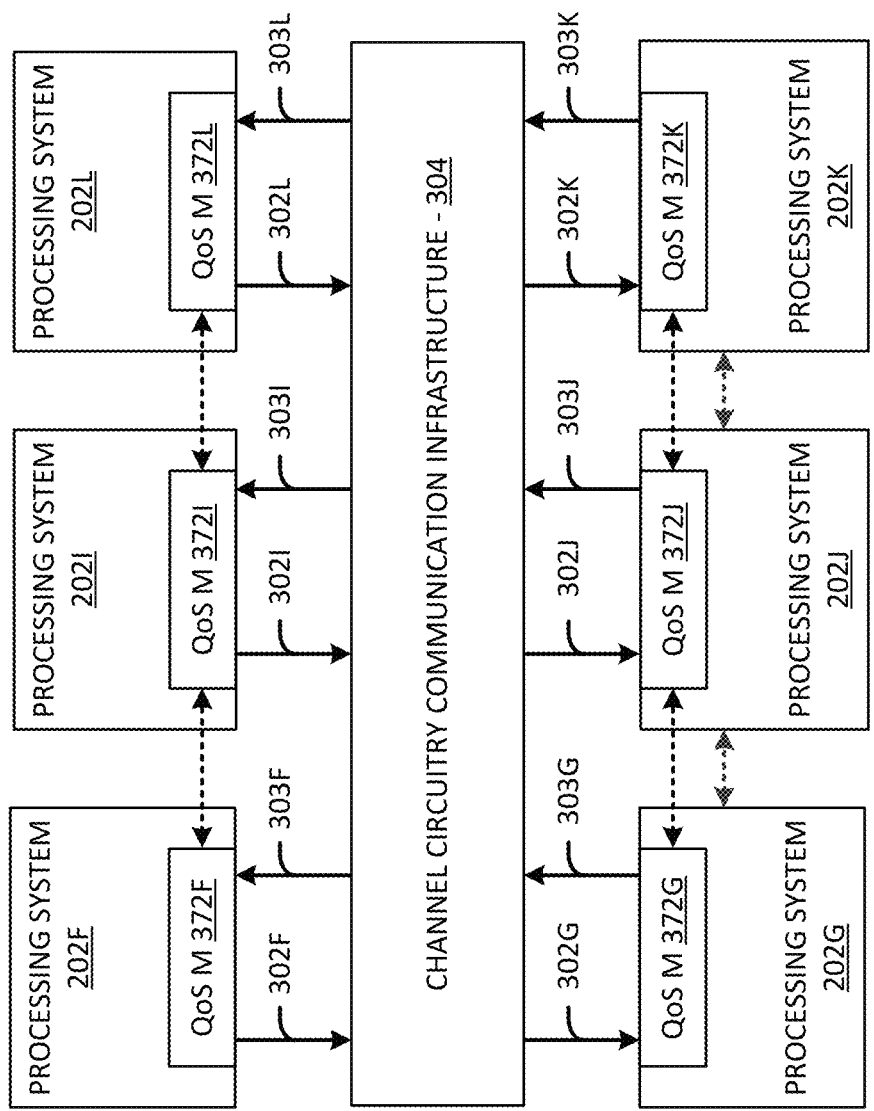
FIG. 3C is a block diagram illustrating a portion of the SoC of FIG. 2 according to a third aspect.

FIG. 3C is a block diagram illustrating a portion of the SoC of FIG. 2 according to a third aspect. With this aspect, the channel circuitry 204 includes channel circuitry communication infrastructure 304, which includes one or more data buses, one or more data switches, one or more data routers, one or more latches, and various other components that service the transfer of data between and among the plurality of processing systems (202F, 202G, 202I, 202J, 202L and 202K shown in FIGS. 3A-3C). With third aspect 370 of FIG. 3C, the QoS manager 206 resides internally to each of the plurality of processing systems 202F, 202G, 202I, 202J, 202L and 202K and services bi-directional communications with the plurality of processing systems 202A-202M to monitor the communications requirements thereof and to manage the communication resources thereof. Further shown are communication paths 302F, 303F, 302G, 303G, 302I, 303I, 302J, 303J, 302L, 303L, 302K and 303K that service communications among and between the plurality of processing systems 202F, 202G, 202I, 202J, 202L, and 202K. The QoS manager 372F, 372G, 372I, 372J, 372L, and 372K is respect to the plurality of processing systems 202F, 202G, 202I, 202J, 202L and 202K and performs the various functions and methods described herein. The third aspect 370 of FIG. 3C may operate according to the concepts previously described with reference to FIG. 2 and the concepts that will be described with reference to FIGS. 4-8.

Figure 4:
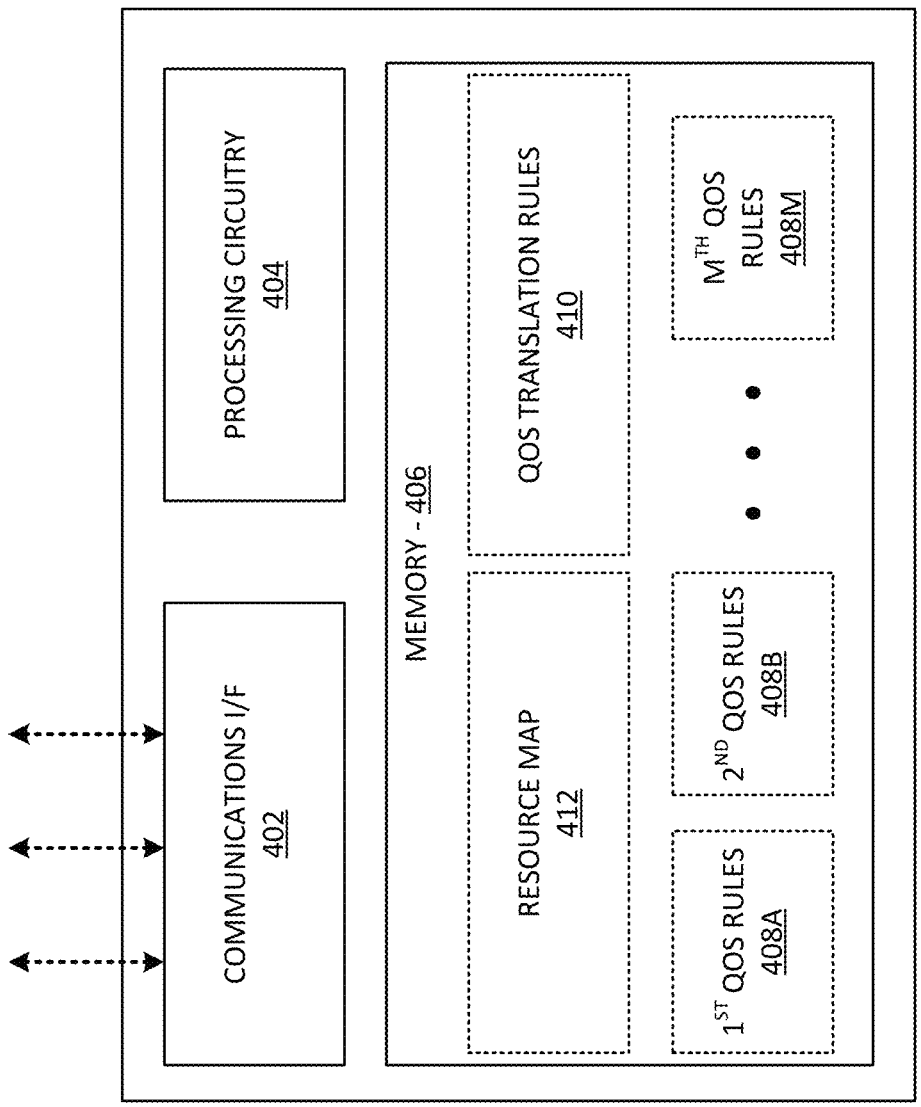
FIG. 4 is a block diagram illustrating a Quality of Service (QoS) manager according to an embodiment of the present disclosure.

FIG. 4 is a block diagram illustrating a Quality of Service (QoS) manager according to an embodiment of the present disclosure. The QoS manager 206 includes a communications I/F 402, processing circuitry 404, and memory 406 that intercouple with one another via communication buses and signal lines. The communications I/F 402 supports wired communications in some embodiments but may support wireless communications in other embodiments. The processing circuitry 404 may be a general-purpose processor, an application specific processor, or other processing circuitry. The memory 406 may be any type of RAM or ROM.

Stored in the memory 406 is a resource map 412 that identifies the available communication resources (and/or other resources) of the serviced plurality of processing systems 202A-202M. This indication may include the status of input buffers, output buffers, and/or communication status of the plurality of processing systems 202A-202M. The memory 406 also stores QoS translation rules for servicing communications between processing systems having differing QoS rules. The memory 406 also stores data relating to the QoS rules 408A-408M of the plurality of processing systems 202A-202M, respectively. The data relating to the QoS rules may be programmed at time of manufacture of the SoC or, alternately, programmed after manufacture. The data may be soft coded or hard coded.

Figure 5:
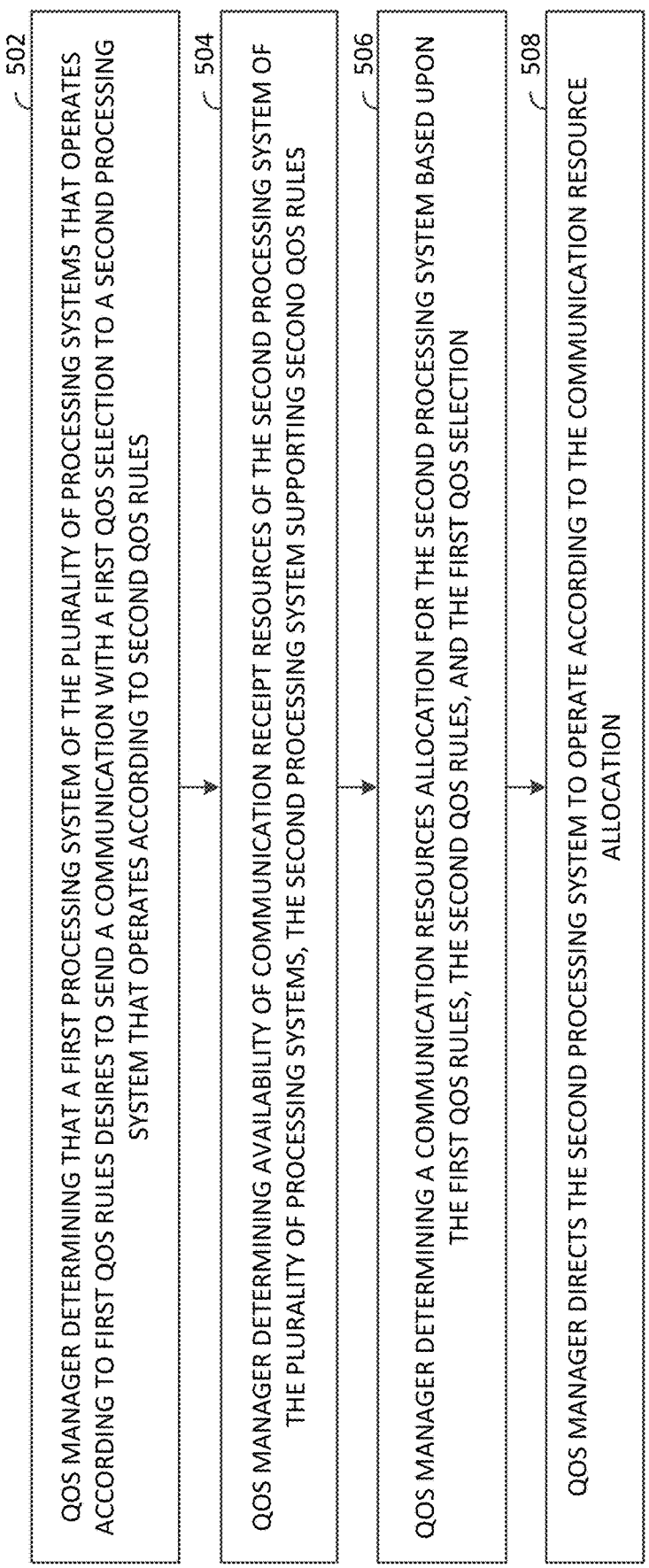
FIG. 5 is a flow chart illustrating operations of the SoC of FIG. 2 according to an embodiment of the present disclosure.

FIG. 5 is a flow chart illustrating operations of the SoC of FIG. 2 according to an embodiment of the present disclosure. The method 500 of FIG. 5 begins with the QoS manager 206 of the SoC 200 determining that a first processing system of the plurality of processing systems that operates according to first QoS rules desires to send a communication with a first QoS selection of the first QoS rules to a second processing system that operates according to second QoS rules (step 502). Operations 500 continue with the QoS manager determining available communication receipt resources of the second processing system of the plurality of processing systems, the second processing system supporting second QoS rules (step 504). Operations 500 further continue with the QoS manager determining a communication resources allocation for the second processing system based upon the first QoS rules, the second QoS rules, and the first QoS selection (step 506). Operations conclude with the QoS manager directing the second processing system to operate according to the communication resource allocation to receive the communication from the first processing system (step 508).

The operations 500 of FIG. 5 may include various options. With a first optional operation, the QoS manager determines whether the communication request was successfully completed. With second optional operation, the QoS manager directs the second processing system to divide its receive buffer into a first portion to service the first QoS selection of the first QoS rules and a second portion to service a second QoS selection of the first QoS rules. This second optional operation may include the QoS manager monitoring a fill state of the first portion, monitoring a fill state of the second portion, and directing the first processing system to transmit data to the second processing system based upon the fill state of the first portion and the fill state of the second portion.

With a third optional operation, the QoS manager monitors transmit buffers of the first processing system, determines the first QoS selection QoS level of a communication from the first processing system to the second processing system, and, based upon the determined QoS level, adjusts an indicated fill state of a receive buffer of the second processing system.

Figure 6:
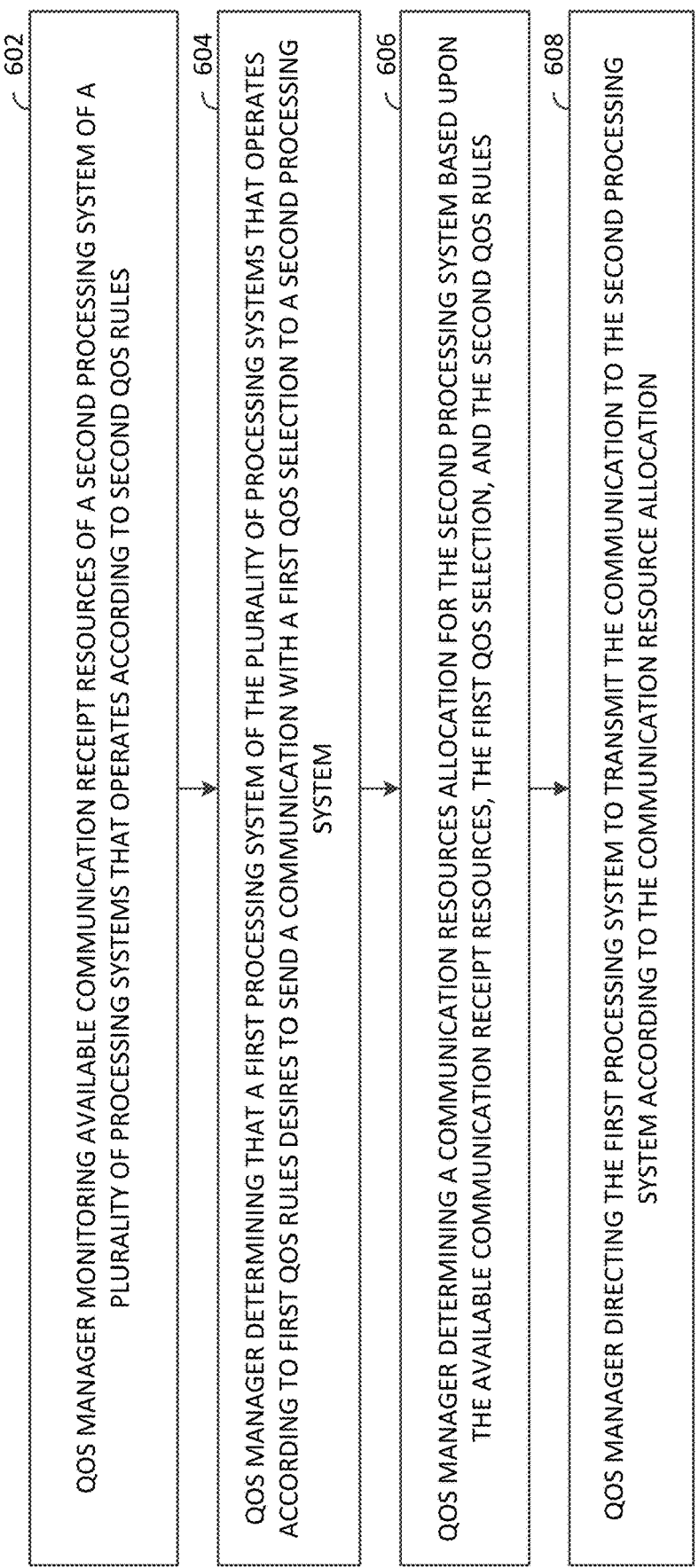
FIG. 6 is a flow chart illustrating operation of the SoC of FIG. 2 according to another embodiment of the present disclosure.

FIG. 6 is a flow chart illustrating operation of the SoC of FIG. 2 according to another embodiment of the present disclosure. The operations 600 of FIG. 6 include a QoS manager monitoring available communication receipt resources of a second processing system of the plurality of processing systems, the second processing system supporting second QoS rules (step 602). The method further includes the QoS manager determining that a first processing system of the plurality of processing systems that operates according to first QoS rules desires to send a communication with a first QoS selection of the first QoS rules (step 604). The operations 600 next includes the QoS manager determining a communication resources allocation for the second processing system based upon the available communication receipt resources, the first QoS selection, the first QoS rules, and the second QoS rules (step 606). The operations 600 finally include the QoS manager directing the first processing system to transmit the communication to the second processing system according to the communication resources allocation (step 608).

The operations of FIG. 6 include a number of optional steps. With one of these optional steps, the QoS manager determines whether the communication request was successfully completed. With another optional step, the communication resource allocation affects a receive buffer of the second processing system that services a first QoS selection of the second QoS rules.

With yet another optional step, the QoS manager may direct the second processing system to divide the receive buffer into a first portion to service the first QoS selection of the first QoS rules and a second portion to service a second QoS selection of the first QoS rules. In such case, the QoS manager may monitor a fill state of the first portion, monitor a fill state of the second portion and direct the first processing system to transmit data to the second processing system based upon the fill state of the first portion and the fill state of the second portion. Further, the QoS manager may monitor transmit buffers of the first processing system, determine the first QoS selection QoS level of a communication from the first processing system to the second processing system, and, based upon the determined QoS level, adjust an indicated fill state of a receive buffer of the second processing system.

Figure 7:
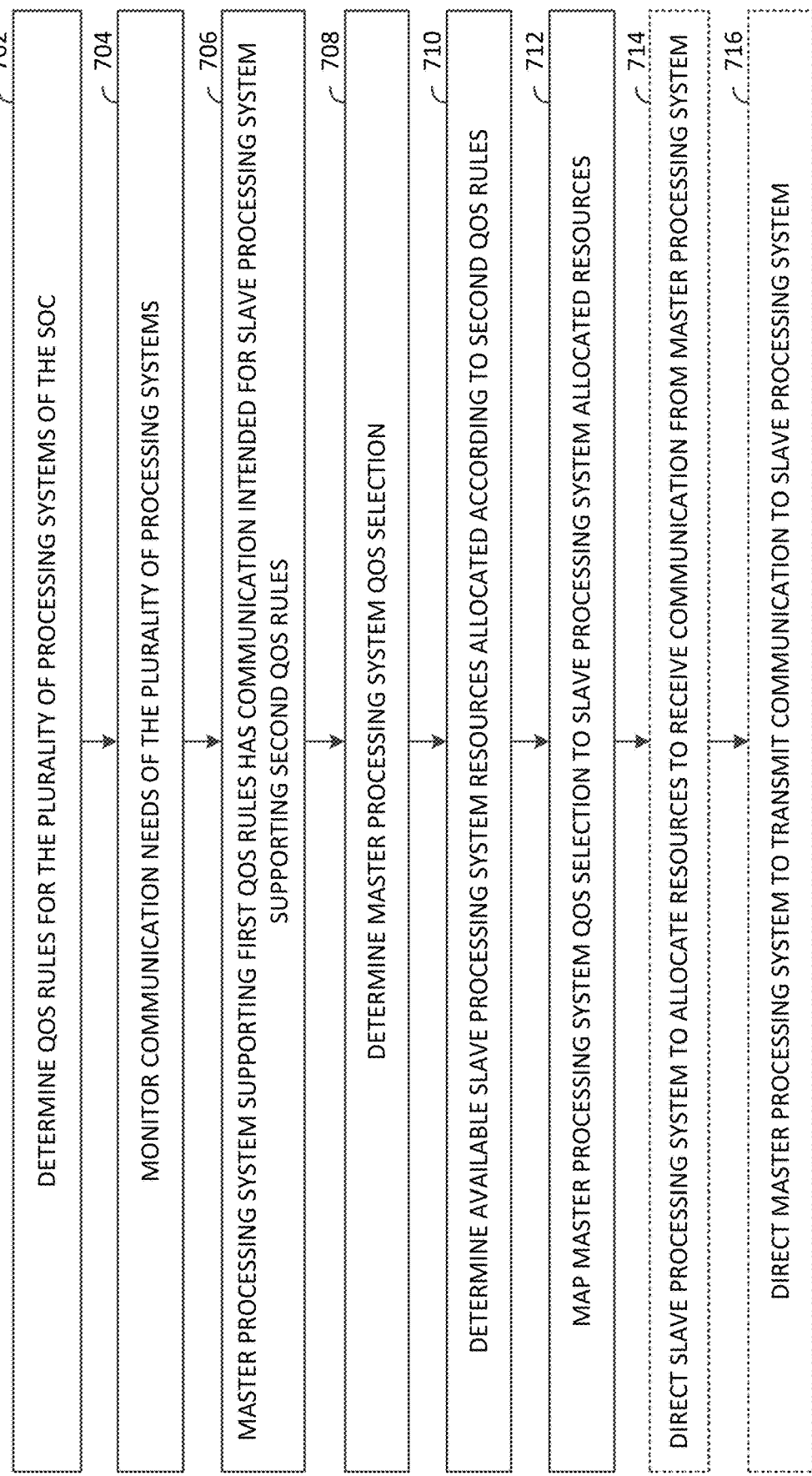
FIG. 7 is a flow chart illustrating operation of the SoC of FIG. 2 according to yet another embodiment of the present disclosure.

FIG. 7 is a flow chart illustrating operations of the SoC of FIG. 2 according to yet another embodiment of the present disclosure. The operations 700 of FIG. 7 consider an overarching view of the operations of the SoC. Operations 700 commence with the QoS manager determining QoS rules for the plurality of processing systems (step 702). Operations 700 continue with QoS manager monitoring the communication needs of the plurality of processing systems (step 704). Operations 700 then include the QoS manager determining that a master processing system that supports first QoS rules has a communication intended for a slave processing system that supports second QoS rules (step 706). The QoS manager then determines the QoS selection of the master processing system for the communication (step 708). Based upon these determinations, the QoS manager determines available slave processing system resources allocated according to second QoS rules supported by the slave processing system (step 710).

The QoS manager then maps the master processing system QoS selection to the slave processing system allocated resources (step 712). Since there is a mismatch between the first QoS rules and the second QoS rules, the QoS manager must map available communication resources of the slave processing system to the communication needs of the master processing system. The QoS manager then optionally directs the slave processing system to allocate resources in preparation for receipt of the communication from the master processing system (step 714). Finally, the QoS manager optionally directs the master processing system to transmit the communication to the slave processing system (step 716). The various operations 700 of FIG. 7 may be performed in a differing order in some embodiments and may include fewer or greater operations in some other embodiments.

Figure 8:
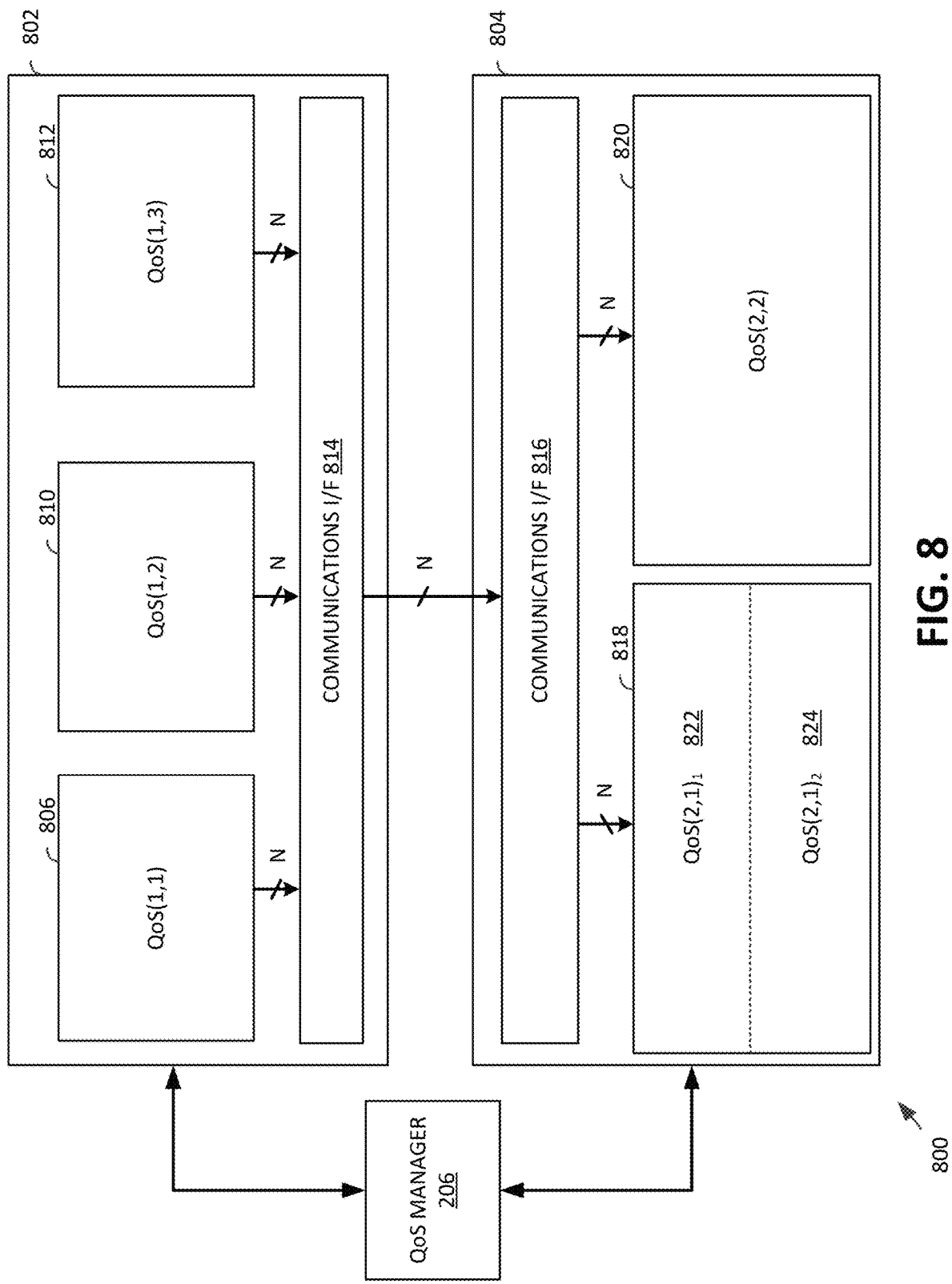
FIG. 8 is a block diagram illustrating a portion of the SoC of FIG. 2 showing the division of buffers to support differing QoS rules and selections.

FIG. 8 is a block diagram illustrating a portion of the SoC of FIG. 2 showing the division of buffers to support differing QoS rules and selections. As was described previously, differing processing systems may support differing QoS rules. In the example of FIG. 8, a first processing system 802 supports first QoS rules with three differing QoS selections. For transmit side operations, the first processing system 802 includes three different transmit buffers, each allocated to a particular QoS selection. For example, transmit buffer 806 is allocated to a first QoS selection of the first QoS rules, transmit buffer 810 is allocated to a second QoS selection of the first QoS rules, and transmit buffer 812 is allocated to a third QoS selection of the first QoS rules. A communications I/F 814 services communications with a communications I/F 816 of a second processing system 804.

The second processing system 804 supports second QoS rules that have two differing QoS selections. A first receive buffer 818 supports a first QoS selection of the second QoS rules while a second receive buffer 820 supports a second QoS selection of the second QoS rules. For transmissions between the first processing system 802 and the second processing system 804 there is a mismatch between transmit buffers 806, 810, and 812 of the first processing system 802 and the receive buffers 818 and 820 of the second processing system. Thus, according to an embodiment of the present disclosure, the QoS manager 206 enacts a communication resource allocation that affects the receive buffer 818 of the second processing system 804. The QoS manager 206 is configured to direct the second processing system to divide the receive buffer 818 into a first portion 822 to service the first QoS selection of the first QoS rules and a second portion 824 to service a second QoS selection of the first QoS rules.

With another option, the QoS manager 206 may be configured to monitor a fill state of the first portion 822, monitor a fill state of the second portion 824, and direct the first processing system 802 to transmit data to the second processing system 804 based upon the fill state of the first portion 822 and the fill state of the second portion 824. Further, the QoS manager 206 may be configured to monitor transmit buffers 806, 810, and 816 of the first processing system 802, determine the first QoS selection QoS level of a communication from the first processing system 802 to the second processing system 804, and, based upon the determined QoS level, adjust an indicated fill state of a receive buffer, e.g., 818, of the second processing system 804.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the teachings herein.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted therewith.

What is claimed is:

1. A system on a chip (SoC) comprising:
   a plurality of processing systems, each processing system of the plurality of processing systems having at least one communication interface supporting respective Quality of Service (QoS) rules; and
   channel circuitry coupled to the plurality of processing systems, the channel circuitry comprising:
      communication circuitry configured to service communications, at least, between the plurality of processing systems and a QoS manager; and
      the QoS manager, wherein the QoS manager is configured to:
         determine that a first processing system of the plurality of processing systems which operates according to first QoS rules has a communication to send with a first QoS selection of the first QoS rules to a second processing system that operates according to second QoS rules,
         wherein the first QoS selection is indicative of a selection of a first QoS level of a plurality of QoS levels associated with the first QoS rules, wherein the QoS levels are associated with different allocations of buffers of the first processing system;
         determine available communication receipt resources of the second processing system of the plurality of processing systems;
         determine a communication resources allocation for the second processing system based upon the first QoS rules, the second QoS rules, and the first QoS selection,
         wherein the communication resources allocation indicates translation of the first QoS selection between the first QoS rules and the second QoS rules, and wherein the translated first QoS selection causes adjustment of at least one buffer of a plurality of buffers of the second processing system; and
         direct the second processing system to operate according to the communication resources allocation to receive the communication from the first processing system.

2. The system on a chip of claim 1, wherein the QoS manager is further configured to determine whether the communication request was successfully completed.

3. The system on a chip of claim 1, wherein the first processing system is a Network on a Chip (NoC).

4. The system on a chip of claim 1, wherein the at least one buffer is a receive buffer of the second processing system, wherein the communication resources allocation adjusts the receive buffer, and wherein the receive buffer services a first QoS selection of the second QoS rules.

5. The system on a chip of claim 4, wherein the QoS manager is configured to direct the second processing system to divide the receive buffer into a first portion to service the first QoS selection of the first QoS rules and a second portion to service a second QoS selection of the first QoS rules.

6. The system on a chip of claim 5, wherein the QoS manager is configured to:
   monitor a fill state of the first portion;
   monitor a fill state of the second portion; and
   direct the first processing system to transmit data to the second processing system based upon the fill state of the first portion and the fill state of the second portion.

7. The system on a chip of claim 5, wherein the QoS manager is configured to:
   monitor transmit buffers of the first processing system;
   determine the first QoS selection QoS level of a communication from the first processing system to the second processing system; and
   based upon the determined QoS level, adjust an indicated fill state of the receive buffer of the second processing system.

8. A system on a chip (SoC) System on a Chip (SoC) comprising:
   a plurality of processing systems, each processing system of the plurality of processing systems having at least one communication interface supporting respective Quality of Service (QoS) rules; and
   channel circuitry coupled to and residing among the plurality of processing systems, the channel circuitry including:
      communication circuitry configured to service communications, at least, between the plurality of processing systems and a QoS manager; and
      the QoS manager, wherein the QoS manager configured to:
         monitor available communication receipt resources of a second processing system of the plurality of processing systems, the second processing system operating according to second QoS rules,
         wherein the available communication receipt resources comprise a plurality of buffers, wherein the second QoS rules are associated with a plurality of QoS levels, and wherein the QoS levels are associated with different allocations of the buffers;
         determine that a first processing system of the plurality of processing systems that operates according to first QoS rules has a communication to send with a first QoS selection of the first QoS rules;
         determine a communication resources allocation for the second processing system based upon the available communication receipt resources, the first QoS selection, the first QoS rules, and the second QoS rules,
         wherein the communication resources allocation indicates translation of the first QoS selection between the first QoS rules and the second QoS rules, and wherein the translated first QoS selection causes adjustment of at least one buffer of the plurality of buffers of the second processing system; and direct the first processing system to transmit the communication to the second processing system according to the communication resources allocation.

9. The system on a chip of claim 8, wherein the QoS manager is further configured to determine whether the communication request was successfully completed.

10. The system on a chip of claim 8, wherein the first processing system is a Network on a Chip (NoC).

11. The system on a chip of claim 8, wherein the at least one buffer is a receive buffer of the second processing system, wherein the communication resources allocation adjusts the receive buffer, and wherein the receive buffer services a first QoS selection of the second QoS rules.

12. The system on a chip of claim 11, wherein the QoS manager is configured to direct the second processing system to divide the receive buffer into a first portion to service the first QoS selection of the first QoS rules and a second portion to service a second QoS selection of the first QoS rules.

13. The system on a chip of claim 12, wherein the QoS manager is configured to:
monitor a fill state of the first portion;
monitor a fill state of the second portion; and
direct the first processing system to transmit data to the second processing system based upon the fill state of the first portion and the fill state of the second portion.

14. The system on a chip of claim 12, wherein the QoS manager is configured to:
monitor transmit buffers of the first processing system;
determine the first QoS selection QoS level of a communication from the first processing system to the second processing system; and
based upon the determined QoS level, adjust an indicated fill state of the receive buffer of the second processing system.

15. A method for operating a system on a chip (SoC) including a plurality of processing systems in communication with a Quality of Service (QoS) manager, the method being implemented by the QoS manager and comprising:
determining that a first processing system of the plurality of processing systems which operates according to first QoS rules has a communication to send with a first QoS selection of the first QoS rules to a second processing system that operates according to second QoS rules,
wherein the first QoS selection is indicative of a selection of a first QoS level of a plurality of QoS levels associated with the first QoS rules, wherein the QoS levels are associated with different allocations of buffers of the first processing system;
determining available communication receipt resources of the second processing system of the plurality of processing systems;
determining a communication resources allocation for the second processing system based upon the first QoS rules, the second QoS rules, and the first QoS selection,
wherein the communication resources allocation indicates translation of the first QoS selection between the first QoS rules and the second QoS rules, and wherein the translated first QoS selection causes adjustment of at least one buffer of a plurality of buffers of the second processing system; and
directing the second processing system to operate according to the communication resources allocation to receive the communication from the first processing system.

16. The method of claim 15, further comprising determining whether the communication request was successfully completed.

17. The method of claim 15, wherein the at least one buffer is a receive buffer of the second processing system, and wherein the method further comprises directing the second processing system to divide its receive buffer into a first portion to service the first QoS selection of the first QoS rules and a second portion to service a second QoS selection of the first QoS rules.

18. The method of claim 17, further comprising:
monitoring a fill state of the first portion;
monitoring a fill state of the second portion; and
directing the first processing system to transmit data to the second processing system based upon the fill state of the first portion and the fill state of the second portion.

19. The method of claim 15, further comprising:
monitoring transmit buffers of the first processing system;
determining the first QoS selection QoS level of a communication from the first processing system to the second processing system; and
based upon the determined QoS level, adjusting an indicated fill state of the at least one buffer, wherein the at least one buffer is a receive buffer of the second processing system.

20. A method for operating a system on a chip (SoC) including a plurality of processing systems and a Quality of Service (QoS) manager, the method being implemented by the QoS manager and comprising:
monitoring available communication receipt resources of a second processing system of the plurality of processing systems, the second processing system operating according to second QoS rules,
wherein the available communication receipt resources comprise a plurality of buffers, wherein the second QoS rules are associated with a plurality of QoS levels, and wherein the QoS levels are associated with different allocations of the buffers;
determining that a first processing system of the plurality of processing systems that operates according to first QoS rules has a communication to send with a first QoS selection of the first QoS rules;
determining a communication resources allocation for the second processing system based upon the available communication receipt resources, the first QoS selection, the first QoS rules, and the second QoS rules,
wherein the communication resources allocation indicates translation of the first QoS selection between the first QoS rules and the second QoS rules, and wherein the translated first QoS selection causes adjustment of at least one buffer of the plurality of buffers of the second processing system; and
directing the first processing system to transmit the communication to the second processing system according to the communication resources allocation.

21. The method of claim 20, further comprising determining whether the communication request was successfully completed.

22. The method of claim 20, wherein the at least one buffer is a receive buffer of the second processing system, wherein the communication resources allocation adjusts the receive buffer, and wherein the receive buffer services a first QoS selection of the second QoS rules.

23. The method of claim 20, further comprising directing the second processing system to divide the receive buffer into a first portion to service the first QoS selection of the first QoS rules and a second portion to service a second QoS selection of the first QoS rules.

24. The method of claim 23, further comprising:
monitoring a fill state of the first portion;
monitoring a fill state of the second portion; and
directing the first processing system to transmit data to the second processing system based upon the fill state of the first portion and the fill state of the second portion.

25. The method of claim 23, further comprising:
monitoring transmit buffers of the first processing system;
determining the first QoS selection QoS level of a communication from the first processing system to the second processing system; and
based upon the determined QoS level, adjusting an indicated fill state of the receive buffer of the second processing system.

\* \* \* \* \*